Patented Nov. 7, 1939

2,178,630

UNITED STATES PATENT OFFICE 2,178,630

METHOD FOR THE PURIFICATION OF CELLULOSE ETHERS

Alexander S. Finlayson, Wilmington, Del., assignor to Hercules Powder Company, Wilmington, Del., a corporation of Delaware No Drawing. Application September 3, 1937, Serial No. 162,389

7 Claims. (Cl. 260—232)

This invention relates to the method for purification of cellulose ethers.

In the manufacture of cellulose ethers, for example, ethyl and benzyl cellulose according to any well known methods, there is considerable variation in the quality of the cellulose ether produced especially with respect to the ash content and the turbidity of solutions and films made from the cellulose ether. These variations in quality are due to the variations in the quality of the caustic soda liquor, the cellulose, the wash water, as well as the variations in the amounts of the materials picked up by the cellulose ether from the equipment used in the carrying out of the etherification reaction.

Mineral acids such as nitric, hydrochloric and sulfuric acids, have been used to remove inorganic impurities from cellulose ethers and are thus well known to the art. Even small traces of such acids in the resultant cellulose ether film, however, adversely affect the properties thereof, as for example by reducing the heat stability. It is therefore necessary when a mineral acid is used to follow it by a stabilizing treatment. Furthermore, the use of the strong mineral acids, above mentioned, necessitates the use of special materials of construction to withstand the attack of these acids. For example, when using hydrochloric acid, glass-lined equipment is necessary for the steeping of the cellulose ether. After steeping, the major part of the acid is removed by washing, followed by neutralization with a slight excess of caustic alkali and a washing out of this caustic alkali. As mentioned above, all of the acid must be removed because even small traces of mineral acid ruin the stability of a film made from the cellulose ether so treated. A dilute solution of a mixed acid, e. g., nitric plus sulfuric acids, has also been found to be beneficial in reducing inorganic impurities, but it is open to the same objections as hereinbefore cited for hydrochloric acid.

It is an object of this invention to provide a process, inexpensive in operation, which readily removes inorganic impurities from substantially water-insoluble cellulose ethers. It is a further object of my invention to provide a process which materially reduces the haze in films made from such cellulose ethers. It is a still further object of my invention to provide a process which accomplishes the foregoing results without the additional step of a stabilization treatment subsequent to the process herein described, and without the necessity of carrying out the process in any specially designed equipment.

I have found, in accordance with my invention, that the inorganic impurities picked up by a water-insoluble cellulose ether during its manufacture may be substantially completely removed by treatment with an aqueous solution containing about .05% to about .5% by weight of a lower fatty acid, and washing with water. I have found that no special stabilizing treatment is necessary after this treatment, thus avoiding a step which has been necessary in the prior processes. In addition, I have found that the above mentioned treatment may be carried out in the apparatus in which the crude cellulose ether has received its preliminary washings, thus eliminating the necessity of specially constructed equipment. Although my process is applicable to substantially water-insoluble cellulose ethers generally, such as, for example, benzyl cellulose and ethyl cellulose, I have found my process particularly advantageous in the treatment of the latter and my invention will be particularly described with reference to ethyl cellulose.

I am aware of the fact that aqueous acetic acid, for example, has been used heretofore for the purification of cellulose ethers, but in the prior processes, the concentration of acetic acid has been of the magnitude of 50% by weight in water which caused swelling of the cellulose ether as a whole, and solution of the lower viscosity components thereof. In my process, the concentration of the fatty acid will be very low and purification will be accomplished without swelling or dissolving of the cellulose ether.

In proceeding in accordance with my invention, I may take, for example, ethyl cellulose, containing about 38% to about 52% ethoxyl content, preferably from about 45 to about 49% ethoxyl, produced by any of the well known methods of ethylation, and after recovery of the crude ethyl cellulose from the reaction mass, either by precipitation or solvent extraction, wash it free from impurities such as caustic soda, salt, residual solvents and various water-soluble bodies with water or other liquids, essentially non-solvents for the ethyl cellulose, followed by washing with dilute acetic acid, for example, of sufficient concentration to convert the insoluble metallic constituents to metallic compounds soluble in the dilute acetic acid wash. I prefer using a concentration of about .05% to about .5% by weight of dilute acetic acid having a final pH of about 4 to 5, but I may use more or less acetic acid in the acid wash than the preferable range stated, depending upon the particular conditions existing.

The dilute acetic acid wash may be left in contact with the ethyl cellulose for an indefinite period without injury to the ethyl cellulose or it may be drained off immediately. I prefer a treatment period of about 2 hours.

After the acetic acid treatment, the ethyl cellulose is washed free of acid to a pH in excess of 4 and preferably to a pH greater than 7 with wash water having preferably a pH of 7.5 to 9. If distilled water is used for the washing operation, the pH is, of course, not a factor and washing is then continued until further washing shows no reduction in the ash content of the ethyl cellulose.

In cases where the inorganic acetates are compatible with the ethyl cellulose when in film form, I have treated the ethyl cellulose with an acetic acid solution having a pH of about 4 to 5, dried the ethyl cellulose without subsequent washing and obtained a satisfactory product for some uses. I prefer, however, washing with water after the acid treatment.

Other fatty acids such as formic acid and propionic acid, may be used in place of acetic acid in the above treatment obtaining similar results as will be hereinafter brought out.

As specific examples of my process, I show the following:

Example I

Ethyl cellulose of 47.2% ethoxyl content in granular, solid form is placed in a purification vessel or tub equipped with a suitable draining screen or false bottom. The ethyl cellulose is washed free of soluble caustic soda, salts and other water-soluble impurities, with treated, untreated or distilled water to a pH of about 9. The ethyl cellulose is then treated with dilute acetic acid having a pH of 4 to 4.2 for about 2 hours and then washed with water having a pH of about 7.9 to 8.3 until the pH of the ethyl cellulose is about 7.

After drying of this ethyl cellulose, 20 grams are dissolved in 80 grams of a mixed solvent composed of 64 grams of toluene and 16 grams of ethyl alcohol. The untreated ethyl cellulose is dissolved similarly. The turbidity or haze of the resulting solutions is then measured with a Betz-Hellige sulfate turbidimeter, the turbidities being expressed as equivalent to milligrams of barium sulfate per 60 cc. of liquid. (It is to be noted here that all turbidity measurements herein shown are determined in the same manner.) The ash content of the treated and untreated material can be determined by any of the well known methods of analysis. The marked improvement given by the dilute acetic acid treatment is clearly demonstrated in Table I.

Table I

|  | Regular water wash | Acetic acid water wash |
|---|---|---|
| Ethoxyl content............percent.. | 47.2 | 47.2 |
| Viscosity *............seconds.. | 12 | 12 |
| Turbidity............ | 3.1 | 1.3 |
| Ash............percent.. | .5 | .25 |

* Viscosity is expressed as the time of fall of a $\frac{1}{16}$″ steel ball through a 20% solution of ethyl cellulose in a solvent mixture composed of 80% by weight of toluene and 20% by weight of alcohol, the conditions of determining viscosity being according to the standard accepted method of determining viscosity by the falling ball method.

Example II

Approximately 100 parts by weight of water-wet ethyl cellulose are placed in a suitable vessel and to this are added 10 parts by volume of 90% formic acid and sufficient water to give about a .5% concentration of formic acid. The ethyl cellulose is allowed to stand in contact with this dilute acid for about 2 hours, after which it is washed with water to a pH of about 7 and dried. A 20% solution of this treated ethyl cellulose in a solvent mixture composed of 80% by weight of toluene and 20% by weight of ethyl alcohol has a turbidity of 2.2 compared with a turbidity greater than 6 on the untreated sample.

Example III

About 100 parts by weight of water-wet ethyl cellulose are treated with 3 parts by volume of propionic acid and 2000 parts of water. The ethyl cellulose is allowed to stand in contact with this dilute acid for about 2 hours and is then washed with soft water to a pH of about 7, and dried. A 20% solution of this treated ethyl cellulose in the same solvent mixture as above, has a turbidity of 2.2 compared with a turbidity of 2.6 on the untreated sample.

It will be understood that various modifications may be made in the treatment as herein described without departing from the scope of this invention.

What I claim and desire to protect by Letters Patent is:

1. A process for purifying substantially water insoluble cellulose ethers consisting of treating said cellulose ethers in solid form with an aqueous solution of a lower fatty acid containing from about 0.05% to about 0.5% of the lower fatty acid, for a period of time sufficient to convert the insoluble metallic constituents in the said cellulose ethers to metallic compounds soluble in the dilute acid solution, and removing the excess fatty acid and water-soluble constituents by washing with water.

2. A process for purifying substantially water insoluble cellulose ethers consisting of treating said cellulose ethers in solid form with an aqueous solution of a lower fatty acid containing from about 0.05% to about 0.5% of the lower fatty acid, for a period of time sufficient to convert the insoluble metallic constituents in the said cellulose ethers to metallic compounds soluble in the dilute acid solution, and removing the excess fatty acid and water-soluble constituents by washing with water having a slight alkalinity.

3. A process for purifying ethyl cellulose consisting of treating ethyl cellulose in solid form with an aqueous solution of a lower fatty acid containing from about 0.05% to about 0.5% of the lower fatty acid, for a period of time sufficient to convert the insoluble metallic constituents in the ethyl cellulose to metallic compounds soluble in the dilute acid solution, and removing the excess fatty acid and water-soluble constituents by washing with water.

4. A process for purifying ethyl cellulose consisting of treating ethyl cellulose in solid form with an aqueous solution of a lower fatty acid containing from about 0.05% to about 0.5% of the lower fatty acid, for a period of time sufficient to convert the insoluble metallic constituents in the ethyl cellulose to metallic compounds soluble in the dilute acid solution, and removing the excess fatty acid and water-soluble constituents by washing with water having a slight alkalinity.

5. A process for purifying ethyl cellulose consisting of treating ethyl cellulose in solid form with an aqueous solution of acetic acid containing from about 0.05% to about 0.5% acetic acid, for a period of time sufficient to convert the insoluble metallic constituents in the ethyl cellulose to metallic compounds soluble in the dilute acetic acid, and removing the excess acetic acid and water-soluble constituents by washing with water.

6. A process for purifying ethyl cellulose consisting of treating ethyl cellulose in solid form with an aqueous solution of propionic acid containing from about 0.05% to about 0.5% propionic acid, for a period of time sufficient to convert the insoluble metallic constituents in the ethyl cellulose to metallic compounds soluble in dilute propionic acid, and removing the excess proprionic acid and water-soluble constituents by washing with water.

7. A process for purifying ethyl cellulose consisting of treating ethyl cellulose in solid form with an aqueous solution of formic acid containing from about 0.05% to about 0.5% formic acid, for a period of time sufficient to convert the insoluble metallic constituents in the ethyl cellulose to metallic compounds soluble in the dilute formic acid, and removing the excess formic acid and water-soluble constituents by washing with water.

ALEXANDER S. FINLAYSON.